H. S. KEYS.
SILO PACKER.
APPLICATION FILED JULY 12, 1916.

1,217,957.

Patented Mar. 6, 1917.
3 SHEETS—SHEET 1.

Hiram S. Keys, Inventor

By Sidney F. Taliaferro

Attorney

H. S. KEYS.
SILO PACKER.
APPLICATION FILED JULY 12, 1916.
1,217,957.
Patented Mar. 6, 1917.
3 SHEETS—SHEET 2.
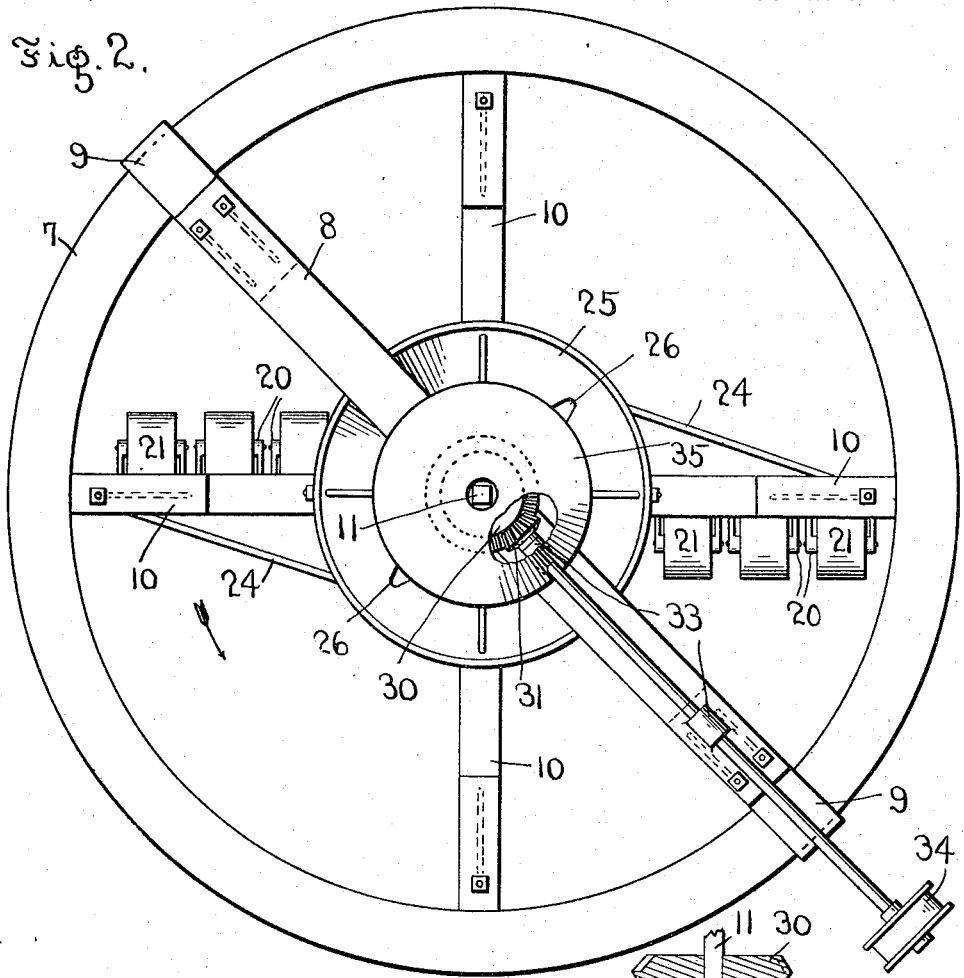
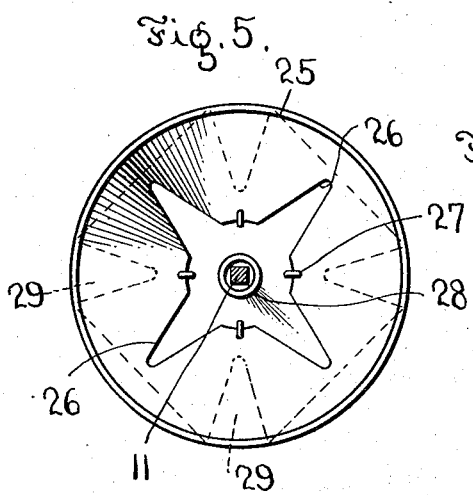
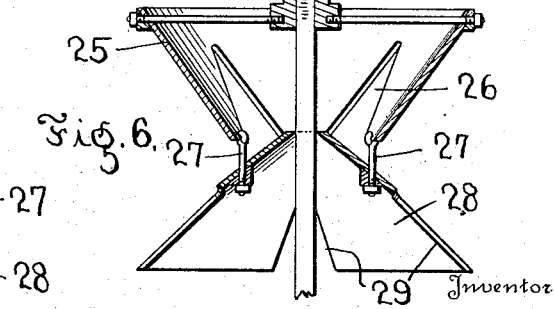
Inventor
Hiram S. Keys
By Sidney F. Taliaferro
Attorney

H. S. KEYS.
SILO PACKER.
APPLICATION FILED JULY 12, 1916.

1,217,957.

Patented Mar. 6, 1917.
3 SHEETS—SHEET 3.

Inventor
Hiram S Keys
By Sidney F. Taliaferro
Attorney

UNITED STATES PATENT OFFICE.

HIRAM S. KEYS, OF EDGECOMB, WASHINGTON.

SILO-PACKER.

1,217,957.  Specification of Letters Patent.  Patented Mar. 6, 1917.

Application filed July 12, 1916. Serial No. 108,939.

*To all whom it may concern:*

Be it known that I, HIRAM S. KEYS, whose application to become a citizen of the United States is pending, now a citizen of Canada, residing at Edgecomb, in the county of Snohomish and State of Washington, have invented certain new and useful Improvements in Silo-Packers, of which the following is a specification.

The present invention relates to mechanism for packing silos, and the object is to provide a simple and effective structure that can be mounted in any well known type of cylindrical silo and will effectively pack the ensilage as the same is introduced into the silo.

A further object is to provide a plurality of packing devices that will independently operate upon a particular portion of the ensilage, so that the ensilage will be properly packed at all points.

A still further object is to provide means that will distribute the ensilage to the packing mechanism and thus secure a more level and even arrangement of the same.

An embodiment of the invention that is at present considered the preferable one, is illustrated in the accompanying drawings, wherein:—

Fig. 2 is a plan view.

Fig. 5 is a plan view of the receiving hopper, and

Fig. 6 is a vertical sectional view through such hopper and the spreader.

Similar reference numerals designate corresponding parts in all the figures of the drawings.

Figure 1:
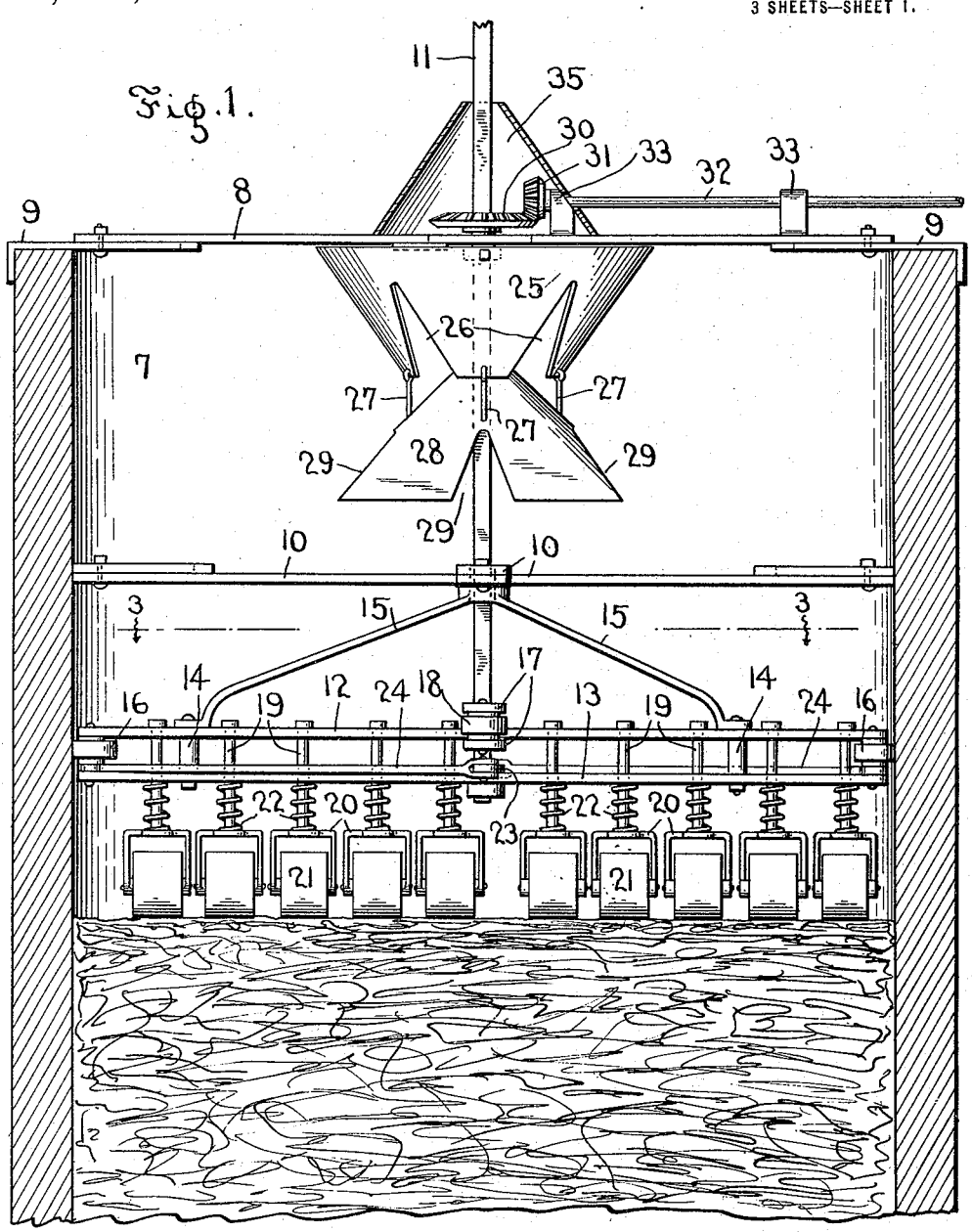
Figure 1 is a vertical sectional view through a portion of a silo showing the apparatus in place therein.

In the embodiment disclosed, a portion of a cylindrical silo is illustrated at 7, and may be of any desired character. Mounted upon the upper portion of this silo is an upper frame, comprising a bar 8 having adjustable terminal hooks 9 that will engage over the top of the silo wall. A second and lower guiding frame 10 is located below the upper frame 8, and passing through these frames is a shaft 11.

This shaft is preferably angular in cross section and is rotatable in the frames 8 and 10, being vertically movable in the former and carrying the latter with it in such vertical movement. The lower end of the shaft carries radially and preferably oppositely disposed arms. These arms consist of upper plates 12 and lower plates 13 held in spaced relation by suitable elements 14 and connected to the shaft 11, above its lower end by suitable braces 15. Journaled upon the ends of the arms 12—13 are guide rollers 16 that operate against the wall of the silo. Other guide arms 17 are disposed at right angles to the arms 12—13 and are provided with terminal rollers 18 that also operate against the interior surface of the silo walls.

Figure 3:
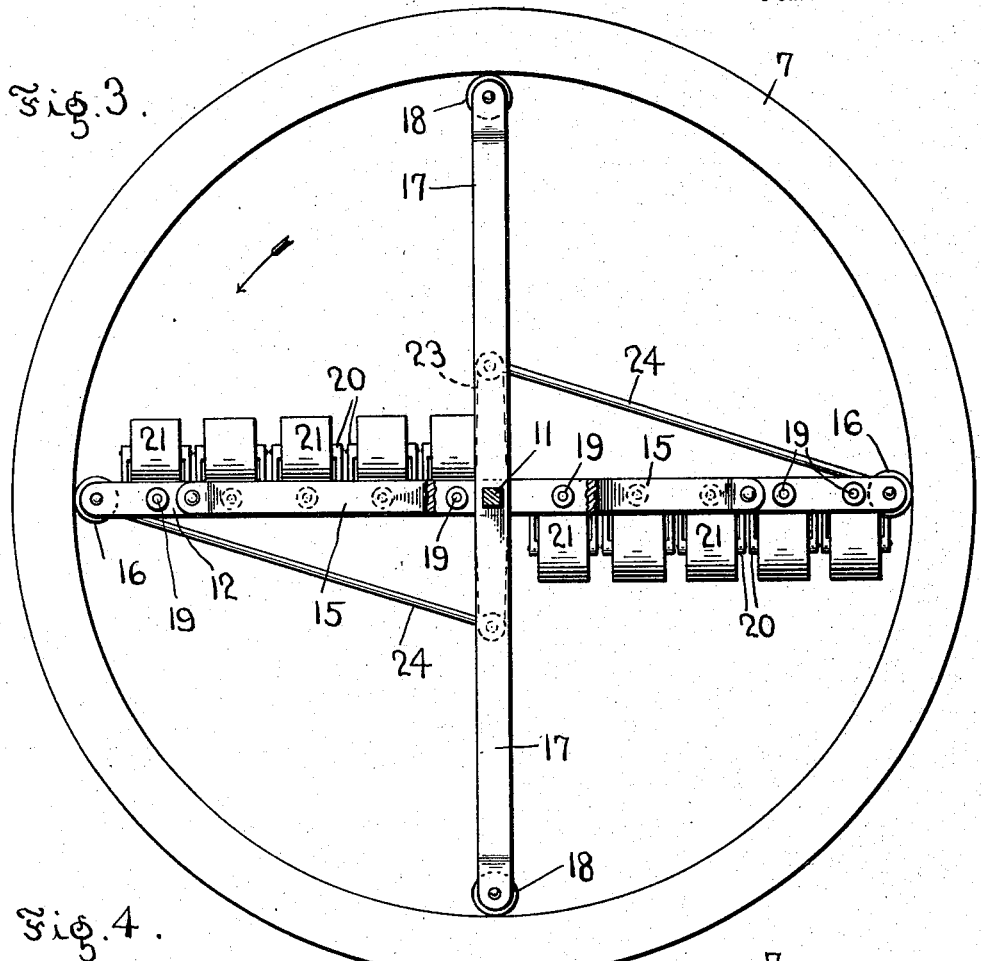
Fig. 3 is a horizontal sectional view substantially on the line 3—3 of Fig. 1.
Figure 4:
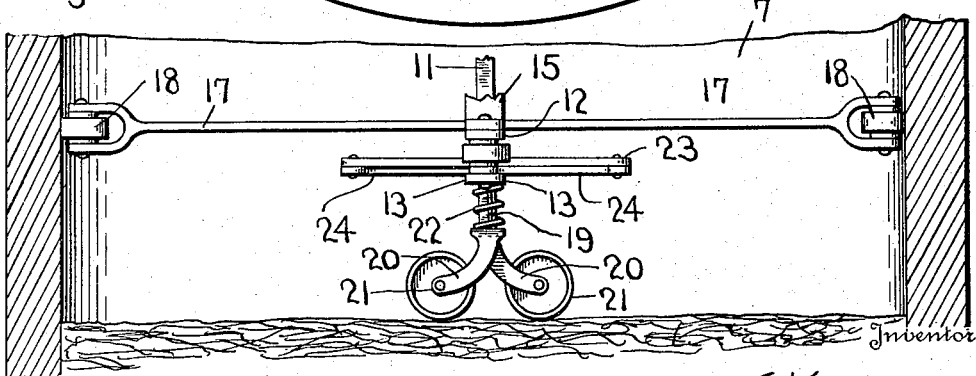
Fig. 4 is a detail view in elevation, at right angles to Fig. 1.

Mounted in the arms 12—13 are vertical pintles 19, that are capable of vertical movement in said arms and also can rotate therein. These pintles carry at their lower ends caster yokes 20, in which are journaled packing rollers 21. The rollers are moved downwardly by coiled springs 22 surrounding the pintles and interposed between the yokes and the lower arm bar. It will be noted, particularly by reference to Fig. 3 that the set of rollers on one arm are staggered with respect to the rollers on the other arm, so that the tracks of the rollers of one set will include the spaces between the tracks of the rollers of the other set. It will also be evident that these rollers are each independent of the other, so that they can move vertically and also have a limited swinging movement on their pintles. Therefore as the structure is rotated, not only will the surface to be packed be gone over, but each roller can yield in case one portion of the surface is higher than the other, while the others are exerting their respective pressures on the surfaces over which they pass.

Extending outwardly at right angles to the arms 12—13, are crank arms 23, said arms being relatively short. Connecting the outer ends of the crank arms 23 with the carrier arms 12—13 are draft rods 24 which serve to steady the structure, and also strengthen the connections between the shaft and said carrier arms.

In order that the ensilage may be properly deposited in the silo, a receiving hopper 25 is supported from the upper frame 8 and is concentric to the shaft 11, this hopper preferably having an open lower end and its side walls being cut away as illustrated at 26. Below the hopper and suspended therefrom by links 27, is a conical spreader 28 that is also disposed concentrically to the shaft 11, and preferably has its walls also cut away, as shown at 29. The shaft is rotated by any suitable means. For example, there is disclosed a beveled gear 30 mounted on the frame 8 and having a squared opening through which the shaft 11 slidably passes. In mesh with this gear wheel is a pinion 31 carried by a shaft 32, which shaft is journaled, as shown at 33 on the frame 8 and is provided at its outer end with a drive pulley 34. It will be understood that the pulley may be operated by a belt from any suitable source of power. In order to protect the gearing 30—31 a conical shield 35 is preferably located thereover.

It is believed that the operation of this structure will be clear. Ensilage introduced into the hopper drops therefrom upon the spreader and is distributed into the silo. The mechanism being set in operation, it will be evident that the rollers will pass over the ensilage thus deposited, and will thoroughly pack the same, each roller acting in its own sphere independently of the others. As the amount of material increases, the rollers, and consequently the entire mechanism, together with the shaft 11, will rise until the silo is substantially filled. The device can, of course be removed and placed in position without difficulty.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In silo packing apparatus, the combination with a rotatable carrier, of means for rotating the same, and sets of spaced packer rollers journaled on the carrier, the rollers of one set operating in the spaces between the tracks of the rollers of the other set.

2. In silo packing apparatus, the combination with a vertically movable and rotatable shaft, of radially disposed carrier arms movable with the shaft, and sets of spaced packer rollers journaled on the arms, the tracks of the rollers of one set including the spaces between the tracks of the rollers of the other set.

3. In a silo packing apparatus, the combination with a rotatable carrier, of packing rollers journaled on the carrier and capable of independent vertical movement.

4. In silo packing apparatus, the combination with a rotatable carrier, of packing rollers journaled on the carrier and capable of independent vertical movement, and means for yieldingly urging the rollers downwardly.

5. In silo packing apparatus, the combination with a rotatable carrier, of packing rollers, upstanding pintles for the rollers journaled on the carrier, and springs for yieldingly urging the rollers downwardly.

6. In silo packing apparatus, the combination with a rotatable carrier, comprising a vertical shaft and radially disposed arms movable with the shaft, of spaced vertical pintles slidably and rotatably mounted on the arms, rollers carried by the pintles, the tracks of the rollers of one set including the spaces between the tracks of the rollers of the adjacent set, and springs mounted on said pintles and urging the rollers downwardly.

7. In silo packing apparatus, the combination with a rotatable shaft and radial arms carried thereby, of packing rollers on the arms, outstanding crank arms mounted on the shaft in angular relation to the arms, and draft rods connecting the crank arms and radial arms.

8. In silo packing apparatus, the combination with a rotatable carrier and sets of packer rollers journaled in the carrier, certain of the rollers of one set being staggered with relation to those of the other set and each of the said rollers of the one set operating in a path that overlaps the tracks of a pair of rollers of the other set.

9. In silo packing apparatus, the combination with a rotatable packer, of means for rotating the same, a depending downwardly tapering hopper disposed above the packer substantially concentric to its axis of rotation, and a substantially conical distributing spreader located below and receiving the material from the hopper, said spreader being disposed above the packer.

10. In silo packing apparatus, the combination with a rotatable carrier, of packing rollers having rotatable caster mountings on the carrier and capable of independent swinging castering movement.

11. In silo packing apparatus, the combination with a rotatable carrier, of packing rollers having rotatable caster mountings on the carrier and capable of independent swinging castering and vertical movements.

12. In silo packing apparatus, the combination with an upper supporting frame, of an intermediate guiding frame, an upright shaft vertically movable and rotatable in the frames, means for rotating the shaft, radially disposed arms carried by the lower portion of the shaft, rollers having caster mountings on the arms and capable of independent vertical movement thereon, means for yieldingly urging the rollers downwardly, a receiving hopper supported on the upper frame, a distributing spreader suspended from the hopper and located below the same, and means for guiding the arms and shaft in their rotation.

In testimony whereof I affix my signature in the presence of two witnesses.

HIRAM S. KEYS.

Witnesses:
 EVA K. LOCKE,
 MELISSA KEYS.